Patented Apr. 13, 1954

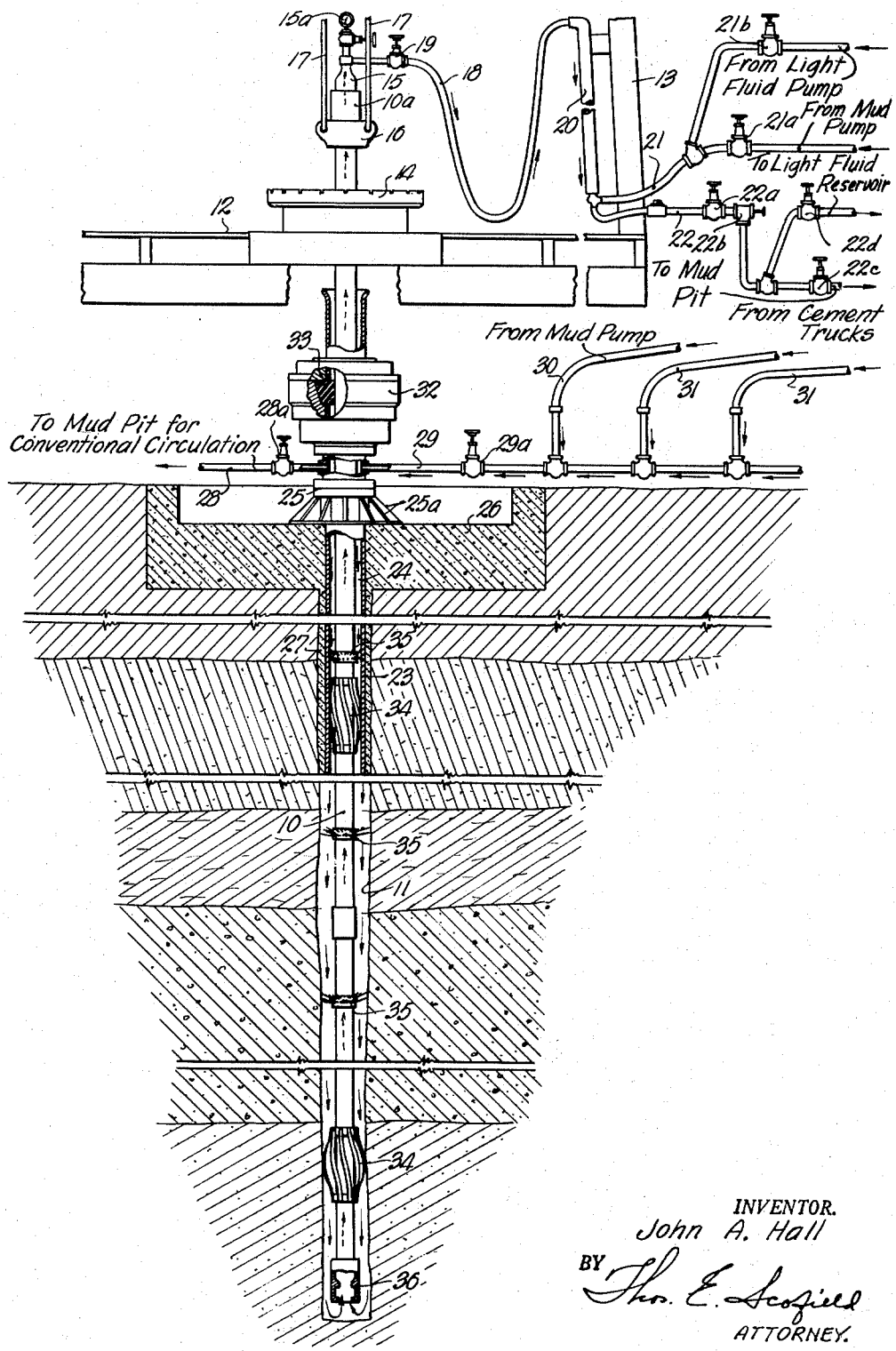

2,675,082

UNITED STATES PATENT OFFICE 2,675,082

METHOD FOR CEMENTING OIL AND GAS WELLS

John A. Hall, Weatherford, Tex.

Application December 28, 1951, Serial No. 263,830

11 Claims. (Cl. 166—22)

This invention relates to improvements in cementing oil and gas wells.

It is conventional in the production of oil to seal off the producing horizon or formation from the other strata above and below in order to prevent, in so far as possible, ingress or intrusion of contaminating material such as water, mud and gas. According to present procedures, cement is introduced into the casing at the well head, and is forced by pressure of drilling mud behind the cement downwardly through the casing and upwardly into the annular space between the casing and well bore. The height of the annular cement fill is, of course, first determined from the location of the formations which are to be sealed, and the amount of cement used is theoretically computed from a careful study of the well log and the annular space to be filled.

While, in general, the above method has so far proved to be the best and most practicable, there are a number of inherent drawbacks which have long plagued oil well cementing. Prominent among these is the fact that in pumping the cement downwardly to the bottom of the casing and then upwardly into the bore hole annulus to the desired height for the cement column, a considerable period of time is involved. This often results in jelling or stiffening of the cement beyond pumpability, a condition aggravated by the relatively high temperatures in the bore hole and the water loss from the cement to the formation; and may even continue to the point where the cement sets before reaching its destination.

A second important drawback stems from the very weight of the cement, it being understood that this customarily is heavier than the drilling mud. As the cement travels downwardly in the casing, its very considerable weight is imposed on the casing string and sometimes is sufficient to cause the casing to fail, particularly when the casing is reciprocated or otherwise manipulated during the placing of the cement. Also, in subsequently pumping the cement up the annulus from the bottom of the casing or from discharge ports in the side thereof, the pump pressure must be sufficient not only to overcome the resistance to flow of the fluid cement, but also to overcome the weight differential between the cement outside of the casing and the mud inside. These excessive pressures in many cases contribute to the failure in obtaining an annular cement column of adequate height because under high pumping pressures the well walls often open up, permitting the loss of the cement to the formation before the cement has sufficiently set, or because the capacity of the pump fails to meet the pressure requirements to raise the cement column to a sufficient height.

It is an object of the present invention broadly speaking to overcome the problems briefly pointed out above. More particularly, it is my aim to provide an arrangement and method for pumping the cement to its destination more speedily than heretofore possible in order to minimize the opportunity for the cement to jell or stiffen en route. Also, it is an objective to reduce the power consumption ordinarily involved in placing the cement; to reduce the excessive pressures employed; and to reduce the load conventionally imposed upon the casing string so that there is less likelihood of failure of the casing under the strain.

To these ends, a feature of the invention resides in providing an improved cementing technique wherein the circulation of the cement and drilling fluid is reversed during the cementing operation. That is to say, according to the invention, instead of pumping the cement downwardly through the casing as is the present practice, I introduce it at the well head into the bore hole annulus and cause it to descend outside the casing to the strata desired to be cemented off.

A further object of the invention is to provide a method of cementing which not only includes the aforementioned reverse circulation technique, but also insures even and uniform distribution of the cement in the annular space between the well bore and casing; which minimizes the tendency of the cement to channel while it is being placed, and which may also develop a good cement bond with the formation.

According to another feature of the invention, I sometimes employ a fluid which not only is lighter than the cement but also lighter even than the drilling mud, in order to obtain a hydrostatic unbalance between the fluid column inside the casing and the annular column outside the casing; said unbalance being in such a direction as to aid in the reversal of fluid flow and in the placing of the cement in a minimum of time, with a minimum of load on the pumping apparatus and without the creation of excessive bottom hole pressures.

Other and further objects, together with additional features of novelty, will appear in the course of the following description.

In the accompanying drawings which form a part of the specification and are to be read in conjunction therewith, and in which like reference numerals indicate like parts of the various views, The figure is a cross section of a portion of an oil well showing a part of the derrick, the drilling table, mud circulating system and cementing appliances indicated diagrammatically.

Referring to the drawing, at 10 is seen a casing which is suspended in the well bore 11 from a derrick having a platform or floor 12. Inasmuch as the derrick is conventional, only one leg thereof has been shown, as at reference numeral 13. The rotary table is indicated at 14. The upper end of the casing is capped with a suitable fitting 15 through which drilling mud or other fluid is introduced to and taken from the casing, as hereinafter explained. The casing is suspended in the well by means of an elevator 16 which grips the casing below collar 10a, and whose bails 17 are hung from a conventional block and tackle (not shown) supported at the crown of the derrick. A flexible mud line 18 is connected at one end to fitting 15 through a control valve 19; the other end of the mud line is connected to the upper end of a pipe 20 attached to the leg of the derrick. The lower end of pipe 20 is connected by a suitable union with a feed line 21 and a discharge line 22. The feed line is branched and communicates via valves 21a and 21b, respectively with the mud pump and a pump for supplying fluid lighter in weight than the mud (e. g., water, oil or lightweight mud). The discharge line 22 extends through a shutoff valve 22a to a needle valve 22b or other suitable type of valve for controlling rate of flow; beyond the flow-controlling valve the discharge line is branched and communicates via valves 22c and 22d respectively with the mud pit and a reservoir for receiving the aforementioned lightweight fluid.

Located below the derrick floor 12 and extending downwardly into the bore hole 11 is a surface pipe or outer secondary casing 23 having a somewhat greater diameter than the casing 10 providing therebetween an annular flow space 24 open at its lower end and freely communicating with the bore hole. This surface pipe is held rigidly in position by means of a conventional pipe support 25 whose radially extending flanges 25a are held in the concrete foundation 26. As shown in the drawing, the foundation is laid in an excavation or cellar below the derrick platform. The annular space between surface pipe 23 and the well wall is sealed by a cement column 27 which is forced in at the time of cementing the foundation. The cement column 27 sealing the surface pipe 23 to the formation is placed during the early stages of drilling the well.

Connected into the annular flow space 24 immediately above pipe support 25 are flow lines 28 and 29 fitted respectively with valves 28a and 29a. As indicated, line 28 leads to the mud pit, and line 29 receives mud through line 30, or cement through lines 31, 31 in a manner to be hereinafter explained.

Located immediately above where lines 28 and 29 connect into the surface pipe and providing a pressure-tight seal for the upper end of the annular flow space 24 is a packing gland or blow-out preventer 32, a conventional piece of oil well equipment. The preventer comprises an outer casing with a bore which forms a continuation of the surface pipe 23. Within the bore of the preventer is a compressible annular packing gland 33 encircling and forming a seal with the outer surface of the casing 10. The packing is of the free stripping type, and allows reciprocation and/or rotation of the casing 10 within the bore hole while providing a continuous pressure-tight seal between the pipes.

Within the lower portion of the surface pipe, and also within the well bore below the surface pipe, the casing is provided at spaced intervals on its outer surface with a plurality of centralizers 34 to maintain the casing centered in the bore. Interspersed at intervals between the centralizers are scratchers or abrading elements 35. These may be of any suitable construction, preferably being of the type having long flexible wire whiskers pivoted to and extending from collars mounted on the casing. It is contemplated, of course, that the centralizers and scratchers will be employed throughout the entire open hole on the string of casing being cemented, sufficient space being left at the top to permit free reciprocation during cleaning and cementing as hereinafter explained.

The bottom of the casing 10 is fitted with a conventional float shoe 36 from which the back pressure valve is removed either before or after the pipe is run to the bottom of the well. The elimination of the back pressure valve is essential, it being necessary to provide means whereby the flow through the casing may be in either direction.

Having described in general the apparatus, the method employed will be described in connection with a typical cementing operation utilizing the invention. To simplify the explanation, it will be assumed that it is desired to cement the casing throughout its full length, i. e., to the full depth of the hole. (However, it will be understood by those versed in the art that the method hereinafter described is not limited to such procedure alone, but is equally applicable to the placing of cement in a particular strata or formation, as, for example, by the use, in the casing string, of a baffle plate sealing off the portion of the string below a predetermined level and a perforated liner affording a flow path between the interior and exterior of the casing above the baffle.)

In the first instance, as is also true in present cementing methods, the casing shoe 36 is attached at the lower end of the bottom section of the casing and the casing is run into the hole. The centralizers 34 and scratchers 35 have been attached at desired intervals before running the well string, the number of centralizers being determined by the character of the well bore. The scratchers are located at more frequent intervals, their spacing being determined primarily by the length of the reciprocation stroke of the casing. During the running of the casing, the packing gland 33 is open to allow free travel of the centralizers and scratchers through the blow-out preventer. Once in the hole, the casing is supported by holding jaws or slips at the rotary table 14 while the circulating head or fitting 15 is connected to the top of the casing and the elevator 16 engaged beneath the upper collar 10a.

Following the running of the casing, mud is circulated by the mud pump in the conventional manner. That is to say, with valves 19, 21a and 28a open and all of the other valves closed, mud received from the mud pump is fed through line 21 upwardly through the stand pipe, then through hose 18 into the upper end of the casing 10 (the flow being opposite to that indicated by the arrows); passing downwardly through the casing the mud is discharged through the float shoe 36 into the bore hole, then flows upwardly in the annulus surrounding the casing and returns to the mud pit via line 28. During this initial circulation, the casing is continuously reciprocated and/or rotated to abrade the wall of the bore hole and remove any accumulated mud cake, which will be carried out along with drillings and sloughings by the circulating mud.

When an inspection of the rotary mud at the pit indicates that the well is substantially clean, the circulation of mud is then reversed in the following manner: packing gland 33 is tightened around the casing to seal off the upper end of the bore hole annulus, and valves 21a and 28a are closed. Valves 22a, 22b, 22c and 29a are then opened, and mud is forced from the mud pump through line 30 into line 29 and into the annular space 24 surrounding the casing. As mud is pumped in, it travels downwardly outside of the casing to the float shoe 36 where it enters the casing and flows upwardly to the circulating head 15. From the circulating head, it passes through flexible hose 18 to line 22 and thence via valves 22a, 22b and 22c back to the mud pit. During the course of reverse circulation, the casing is manipulated as before, the blow-out preventer maintaining a continuous pressure seal and insuring circulation of the mud in the direction indicated by the arrows.

Once the reverse circulation cycle has been established, the well is ready for cementing. The mud pump is now cut off, and cement is pumped from the cement trucks through lines 31 into the annulus 24, driving the mud ahead of it so that the mud continues to be discharged from the upper end of the casing back to the mud pit; the rate of this discharge can be controlled and limited by valve 22b. As the cement travels downwardly, the casing is continuously manipulated as before, the abrading fingers of the scratchers serving to distribute and minimize channeling of the cement. The manipulation of the casing during cementing is also necessary to maintain an open path for the cement; otherwise, the cement will tend to build up in restricted zones and close off the annulus, reducing or stopping circulation and in some instances preventing movement of the casing.

The cementing operation is continued in the above fashion until such time as the cement has entered shoe 36 and has begun to flow upwardly into the casing. The moment when this occurs can be determined with reasonable accuracy by observation of the reduction in volume and velocity of mud returns measured at the surface, as well as the variations in pressure registered on pressure gauge 15a. This measurement can be facilitated by providing in or near the shoe a restricted orifice which will cause a more pronounced flow change to appear at the time the cement enters the pipe if the cement is of greater viscosity than the mud. Also, a conventional weight indicator, an instrument showing the approximate weight of the pipe and its contents, may be employed in the suspension system for the pipe, in which case the entry of the cement will be reflected by the change in weight of the casing. In addition, of course, the calculated amount of cement to fill the annulus is a determining factor.

In the situation where only a partial cementing is contemplated, i. e., where the cement column will be localized somewhere between the top and bottom of the bore hole, the amount of cement is theoretically calculated in advance in the same manner as is done in conventional cementing practice. Once the selected volume of cement has been introduced circulation is continued by forcing mud in behind the cement or between batches of cement until the estimated depth has been reached. The circulation can be immediately stopped by shutting the valve 19 at the circulating head 15, whereupon manipulation of the casing is then halted, and the cement is allowed to set.

The following alternative mode of operation can be used to great advantage in cementing some, but not all, wells. After the initial mud circulation (i. e., circulation downwardly in the casing and upwardly in the annulus) has been established as described above and it appears from examination of the mud being discharged into the mud pit through the line 28 that the well is substantially clean, the mud pump is halted and valve 21a is closed. Valve 21b now is opened permitting the lightweight fluid, which may be water, oil or lightweight mud, depending upon the circumstances, to be pumped through the feed line 21 into the upper end of the casing in place of the heavier drilling mud previously circulated.

The amount of lightweight mud thus pumped in behind the drilling mud to continue the circulation in the same direction will vary in accordance with the condition of the well walls, the bottom hole pressure encountered and various other factors, it being desirable in some cases only to introduce enough lightweight fluid to fill the upper portion of the casing. In other cases, it is desirable to introduce enough to completely fill the casing, leaving the heavier drilling mud in the annulus around the casing however; and in still others, a greater amount of lightweight fluid is introduced so that it fills not only the interior of the casing but also extends upwardly outside the casing to some predetermined level in the bore hole.

When the desired amount of lightweight fluid has been introduced, valves 21b and 28a are closed and valves 22a, 22b, 22d and 29 are opened. The difference in the hydrostatic head of the fluid inside and outside the casing now tends automatically to reverse the circulation. The cement slurry can immediately be pumped from the cement trucks into the annulus through lines 31 but more often it is desirable first to pump drilling mud in through line 30 until the reverse circulation is well established and then to shut off the mud pump and begin feeding in the slurry received via lines 31. Whichever practice is followed, the weight differential between the column of fluid inside the casing and that outside aids in initiating and maintaining the reverse circulation so that less pumping pressure is required and the bottom hole pressure is less than would otherwise be the case. The cement can be mixed and fed faster, yet less pumping power is needed. There also is less tendency for the mud or cement to be forced laterally of the bore hole into weak or unconsolidated formation zones near the surface; and in the event difficulty is encountered due to loss of circulation as sometimes happens in practice, the method greatly facilitates re-establishment of circulation.

It will be understood that the aforementioned use of lightweight fluid cannot be adopted in cementing all wells, and should be employed with caution, for example, in the case of high-pressure wells where, despite the flow-limiting effect that can be achieved with the control valve 22b, there exists the possibility of a blowout if a fluid column too light to hold the pressure is used. However, it is admirably suited to aiding my reverse circulation method in many instances and, when appropriate, gains the important advantages outlined above.

My method also is susceptible to modification in another respect when the walls of the bore hole to be cemented are relatively clean to begin with, or are relatively easy to clean. In such cases, it is possible to eliminate the preparatory step of circulating drilling mud in what has been referred to hereinbefore as the "conventional" direction; that is to say, instead of initially pumping mud into the upper end of the casing to establish circulation downwardly in the casing and thence upwardly in the annulus for the purpose of removing drillings, sloughings, mud cake, etc., it is possible, when such cleaning of the bore hole is not required, to immediately begin the cementing operation with the circulation of the mud in the reverse direction, i. e., downwardly in the annulus and thence upwardly in the casing as has been described. After circulation in this direction has been established, the pump supplying the mud through line 30 is cut off and the calculated amount of cement slurry is fed into the annulus through line 31 so that it travels downwardly to the desired destination, it being understood that the casing is reciprocated during the placing of the slurry to abrade cement cake from the walls and maintain an open path for the slurry. The cementing operation, in other words, is carried out in the same fashion as explained earlier except for the fact that the preliminary step of circulating mud in the conventional direction for cleaning purposes is eliminated.

As would seem obvious, a primary advantage of the reverse circulation method lies in the relatively low pressures necessary to place the cement, since gravity assists in the placing of the cement slurry. This becomes extremely important in dealing with wells having zones of relatively low strength where abnormal pressures to the well are apt to cause the loss of cement or mud to the side wall formation. In many cases, the gravitational weight of the cement alone is often enough to eliminate all but nominal pumping pressures. In the case of extremely deep wells where the weight of the cement column alone exerts high pressures on the formation, the destructive effect of high pressures at or near the bottom of the column can be reduced by mixing with either all of the cement, or portions of the cement, or the cement forming the upper part of the column, a stiffening agent such as "Aquagel" or bentonite. The stiffening agent increases the viscosity of the cement and causes increased frictional flow resistance in the annulus, thus reducing excessive pressures at or near the bottom of the column.

A further advantage in cementing deep wells is that unlike conventional methods, the casing is not required to carry the weight of the cement. In such operations, the weight of the cement in a casing can cause the casing to fail during reciprocation. In the present method, however, the cement is not carried by the casing, but flows around and down its exterior so the load has no chance of exceeding its safety factor.

By the combined use of centralizers and scratchers, the casing is maintained centrally of the well bore and mud accumulations are abraded from the wall of the well reducing the likelihood of cement channeling and obtaining a more even distribution of the cement in the well. Furthermore, there is provided at all times during the placing of the cement an open path or annulus for the free pasage of the cement, the scratchers and centralizers keeping the cement slurry sufficiently scratched away from the surface of the formation until the entire cement column has been introduced to the well.

A further advantage of cementing by the reverse circulation technique is that the cement is pumped to its destination in aproximately half the time thereby reducing the possibility of the cement setting up before it is pumped to its destination.

To further improve the pumpability of the cement and delay its setting time, a retarding agent may be introduced either into the first part of the cement mixed, or into portions of the cement, or into all of it. This will give more definite assurance that the cement will be pumped to its destination in holes with a high water loss or high temperatures, or that have been drilled to a great depth.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A reverse circulation cementing method for wells in which a casing having abrading elements thereon is suspended for manipulation in the well bore and connections are supplied for circulating mud and cement into the well comprising the steps of circulating mud downwardly through the casing and upwardly into the annulus surrounding the casing in a continuous cleaning cycle while manipulating the casing to abrade the mud cake from the well bore, discontinuing the cleaning cycle and reversing the circulation of the mud to establish a reverse circulation cycle, then interrupting the mud flow by introducing a cement slurry into the reverse circuation cycle by supplying cement in a predetermined amount to the annulus surrounding the casing and withdrawing mud from the top of the casing until the cement descends to the desired location in the well bore.

2. A method as in claim 1 wherein the casing is manipulated during the reverse circulation cycle as well as during the cleaning cycle.

3. A method as in claim 1 wherein a stiffening agent is mixed with at least a portion of the cement slurry to retard its rate of flow downwardly in the annulus.

4. A reverse circulation cementing method for wells in which a casing having abrading elements thereon is suspended for manipulation in the well bore and connections are supplied for circulating mud and cement into the well, comprising the steps of circulating mud downwardly through the annulus surrounding the casing and upwardly into the casing in a continuous reverse circulation cycle, interrupting the mud flow by introducing a cement slurry into the reverse circulation cycle by supplying cement in a predetermined amount to the annulus surrounding the casing and withdrawing mud from the top of the casing until the cement descends to the desired location in the well bore, and manipulating the casing during reverse circulation of the mud and cement.

5. A method as in claim 4 wherein a stiffening agent is mixed with at least a portion of the cement to retard its flow downwardly in the annulus.

6. A method of cementing a well in which there is suspended a casing having an opening in its lower portion and also having abrading elements along its length, comprising the steps of pumping mud into the upper end of the annulus around the casing whereby it descends in the annulus to said opening, enters the casing through said opening, then ascends inside the casing and is discharged from the upper end of the latter; during said circulation of mud moving the casing to cause said elements to abrade tthe mud cake from the well bore; discontinuing said introduction of the mud into the annulus after an interval of time and substantially at once feeding a cement slurry into the upper end of the annulus to descend around the casing while continuing the discharge of mud from the upper end of the casing; discontinuing the feeding of the slurry into the annulus when a predetermined amount has been introduced therein; and halting the discharge of the mud from the upper end of the casing when the slurry has descended to the desired location in the well bore.

7. A reverse circulation cementing method for wells in which a casing is suspended, comprising the steps of pumping mud into the upper end of the casing whereby it travels downwardly in the casing, and is discharged into the annular space around the casing, then travels upwardly in the annular space and is discharged at the upper end of the latter in a continuous cleaning cycle; discontinuing the introduction of mud into the casing after an interval of time and beginning to pump into the upper end of the casing in place of the mud a fluid lighter in weight than the mud thereby to continue the circulation in the same direction; discontinuing the introduction of said lighter fluid before the last of the mud ahead of said fluid has been discharged from the upper end of said annular space; then permitting said lighter fluid to escape from the upper end of the casing to establish circulation in the reverse direction; introducing a cement slurry into the upper end of said annular space to continue the reverse circulation; and halting the discharge of fluid from the upper end of the casing when the slurry descending in the annular space has reached tthe desired location in the well bore.

8. A method as in claim 7 wherein the introduction of said lighter fluid into the upper end of the casing is halted before the last of the mud ahead of said fluid has been discharged from the casing into the annular space around the casing.

9. A method as in claim 7 wherein the introduction of said lighter fluid into the upper end of the casing is halted after the last of the mud ahead of said fluid has been discharged from the casing into the annular space around the casing.

10. A method as in claim 7 wherein the introduction of said lighter fluid into the upper end of the casing is halted when the amount of fluid so introduced is substantially equal to the volume of the casing between the upper end thereof and the point of discharge from the casing to the annular space around same.

11. A method as in claim 7 wherein said casing has abrading elements thereon and is moved during the cleaning cycle and during the introduction of the cement slurry to cause the elements to abrade mud cake and cement cake from the well wall.

References Cited in the file of this patent

UNITED STATES PATENTS

| Number | Name | Date |
| --- | --- | --- |
| 326,439 | McEachen | Sept. 15, 1885 |
| 2,041,086 | O'Brien | May 19, 1936 |
| 2,188,767 | Cannon et al. | Jan. 30, 1940 |
| 2,392,352 | Wright | Jan. 8, 1946 |

FOREIGN PATENTS

| Number | Country | Date |
| --- | --- | --- |
| 10,926 | Great Britain | 1912 |

OTHER REFERENCES

The Petroleum Engineer, November 1948, pages 117–120, 122–124, pages 120 and 122 relied on.